Figure 1:
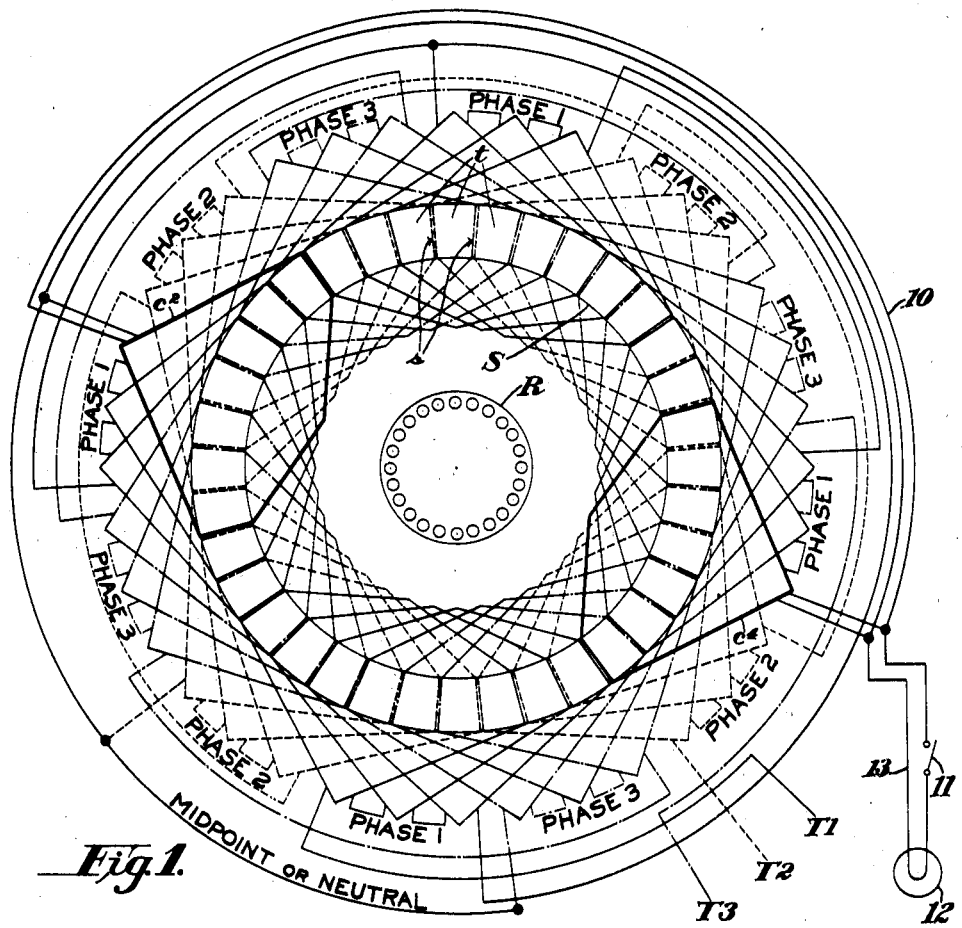

Sept. 19, 1939.　　　P. H. TRICKEY　　　2,173,458
ALTERNATING CURRENT MOTOR WITH LOW-VOLTAGE LAMP TAPS
Filed July 14, 1937　　　2 Sheets-Sheet 1

Inventor
Philip H. Trickey
By John F. Heine
Attorney

Witness:
John N. Cave

Sept. 19, 1939.  P. H. TRICKEY  2,173,458
ALTERNATING CURRENT MOTOR WITH LOW-VOLTAGE LAMP TAPS
Filed July 14, 1937  2 Sheets-Sheet 2
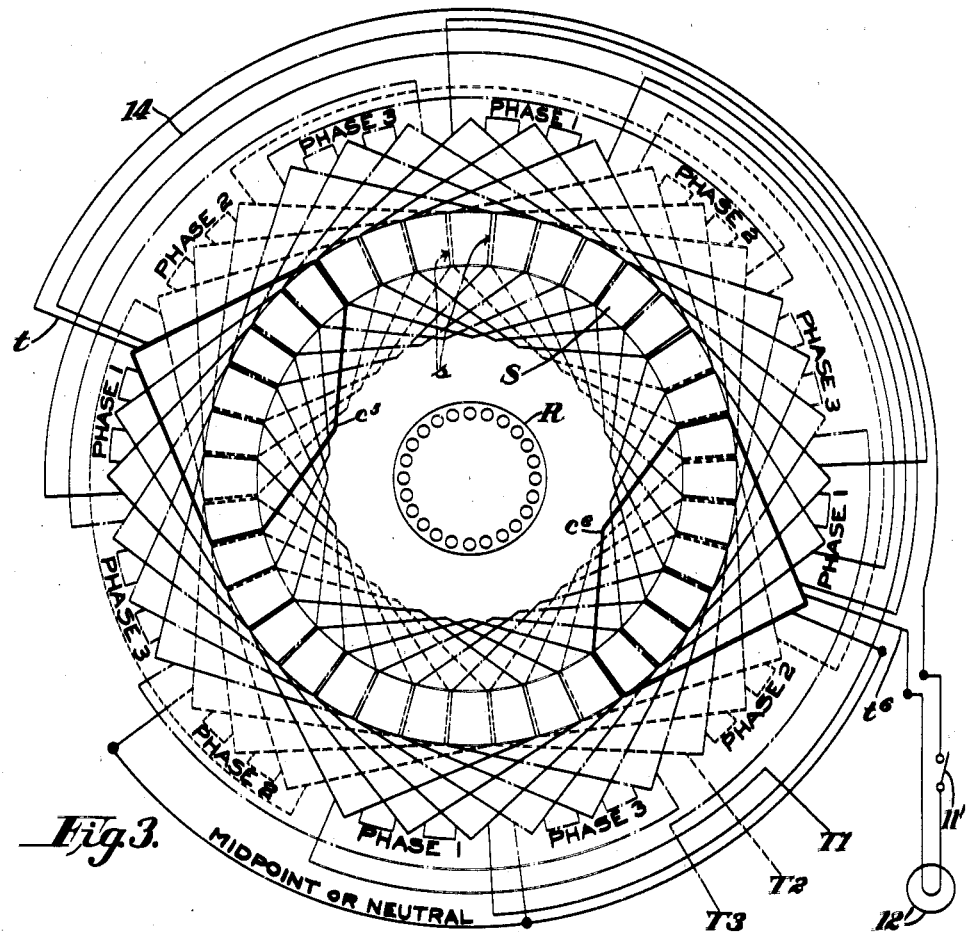
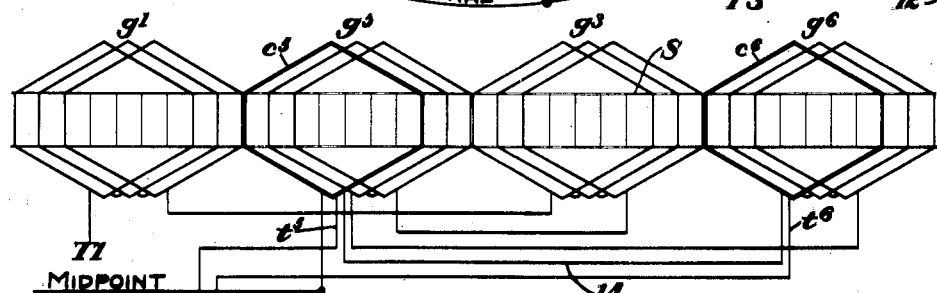
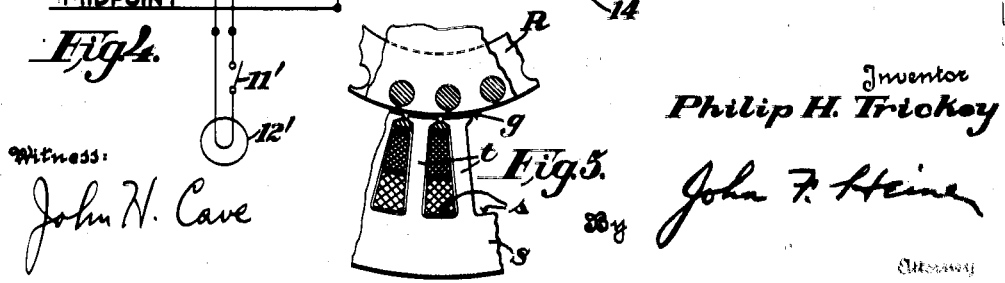
Inventor
Philip H. Trickey Patented Sept. 19, 1939

2,173,458

UNITED STATES PATENT OFFICE 2,173,458

ALTERNATING CURRENT MOTOR WITH LOW-VOLTAGE LAMP TAPS

Philip H. Trickey, Elizabeth, N. J., assignor to The Singer Manufacturing Company, Elizabeth, N. J., a corporation of New Jersey Application July 14, 1937, Serial No. 153,509

1 Claim. (Cl. 172—120)

This invention relates to constant speed alternating current motors more particularly of the fractional horse-power type used for driving sewing machines.

It is common to provide a motor of this type with a treadle-controlled clutch and brake mechanism for controling the operation of a driven shaft which carries a sewing-machine-driving belt-pulley.

Outfits of this kind are known in the trade as "electric transmitters" and are mounted below the tops of the usual sewing machine supporting power-benches in garment manufacturing establishments; each sewing machine being driven by its own individual electric transmitter.

It is also the practice to provide sewing machines in garment manufacturing establishments with individual lighting fixtures, and recently the practice has grown of fitting these fixtures each with a low-voltage lamp which is energized from a tapped portion of the stator winding of the individual electric transmitter used for driving the particular sewing machine carrying the lighting fixture.

In following this practice it has been found that electric transmitter motors having stator windings which are tapped to supply low-voltage lamps are prone to develop an objectionable humming noise when the lamp is turned on. This propensity requires that great care be exercised in the manufacture of such a motor to secure quiet operation and even though quiet operation be initially secured by the exercise of extreme manufacturing care it is likely to be lost as the motor ages and the parts thereof become slightly worn.

The present invention, therefore, has for an object to provide an alternating current motor of the substantially constant speed type with a stator winding which is tapped to supply a low-voltage lamp and which is so contrived as to eliminate the heretofore encountered propensity of such a motor to develop an objectionable humming noise when the lamp is turned on.

Stated in another way, the invention has for an object to provide an alternating current motor of the constant speed type which has its stator winding tapped for a low-voltage lamp supply and which is as quiet in operation with the lamp turned on as it is with the lamp turned off.

With the above and other objects in view, as will hereinafter appear, the invention comprises the devices, combinations and arrangements of parts hereinafter set forth and illustrated in the accompanying drawing of two preferred embodiments of the invention, from which the several features of the invention and the advantages attained thereby will be readily understood by those skilled in the art.

I have discovered that the desired ends may be attained by uniformly distributing the exciting stator winding circumferentially of the stator core while at the same time directly connecting together, either in series or in multiple, two diametrically opposed coils of such winding spanned by the low-voltage lighting taps to be connected to the lamp. Thus, when the lamp is turned on, the radial disturbing magnetic effects on the rotor of the lamp-current in the spanned coils will be equalized at two diametrically opposed parts of the stator and will balance out.

Figure 2:
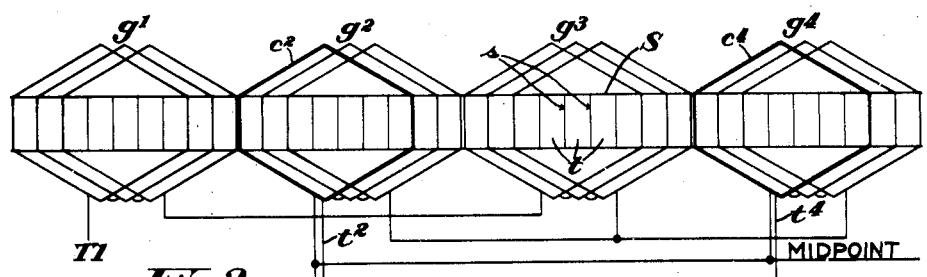

In the accompanying drawings, Fig. 1 is a circular diagrammatic representation of a three-phase alternating current induction motor embodying the invention; the lamp-spanned diametrically opposed coils of the exciting winding of which motor are directly connected in parallel relation. Fig. 2 is a winding diagram of the phase of the exciting winding of the motor represented in Fig. 1 containing the lamp-spanned coils. Fig. 3 is a circular diagrammatic representation of a similar motor embodying the invention; the lamp-spanned diametrically opposed coils of the exciting winding of which motor are directly connected in series relation. Fig. 4 is a winding diagram of the phase of the exciting winding of the motor represented in Fig. 3 containing the lamp-spanned coils, and Fig. 5 is a fragmentary view of the associated stator and rotor elements of the motors of Figs. 1 to 4, inclusive.

Referring to Figs. 1, 2 and 5, the motor comprises the usual internally toothed ring-shaped stator core S and associated low-resistance, solid-bar, squirrel-cage rotor R, with the usual narrow air-gap $g$ between the two. Such a motor will run at a substantially constant speed. The stator shown has 36 slots $s$ between its teeth $t$.

Disposed in the slots $s$ is a balanced three-phase four-pole Y-connected winding. Phase I, shown in full lines and connected to line terminal $T_1$, is of the special construction to be described, while phases 2 and 3, shown in dotted lines and dot-dash lines, respectively, are conventional and are connected respectively to the line terminals $T_2$ and $T_3$. The coils of each phase span seven teeth. The coils of phases 2 and 3 are divided into four polar groups for each phase, as shown in Fig. 1.

The individual coils of phase I, Fig. 2, which four polar groups $g^1$, $g^2$, $g^3$, $g^4$. The diametrically opposed coils of groups $g^1$ and $g^3$ are identical in all respects with the coils of phases 2 and 3 and are directly connected together in series to the line terminal $T_1$. The individual coils of groups $g^2$ and $g^4$ are of the same span as the coils of groups $g^1$ and $g^3$ but have double the number of turns of wire having half the cross-sectional area of the wire used for the coils of groups $g^1$ and $g^3$. It will be observed in Fig. 2 that groups $g^2$ and $g^4$ are connected in parallel relationship and that these parallel-connected groups are connected in series with the series-connected groups $g^1$ and $g^3$. Thus, there are the same number of ampere-turns in each of the individual coils of phase 1.

The special individual end-coils $c^2$ and $c^4$ of groups $g^2$ and $g^4$, shown in heavy lines in Figs. 1 and 2, are of the same identical construction as the remaining coils of their respective groups with the exception that taps $t^2$ and $t^4$ are taken out at the same intermediate point of each coil. Taps $t^2$ and $t^4$ are directly connected together by the conductor 10 which is directly connected through the switch 11 to one terminal of the low-voltage lamp 12.

The mid-point or neutral connection of the stator-winding also directly connects together the other leg of the tapped portion of the coils $c^2$ and $c^4$ and is connected by the conductor 13 to the other terminal of the lamp 12. Thus the lamp spans two equal coils or an equal number of turns of each of two coils which are diametrically opposed and are directly connected together in parallel relationship.

With the switch 11 open and the motor running, the three phases of the winding are electrically and magnetically in balance; there being a balanced distribution of ampere-turns of the winding circumferentially of stator. The motor will operate with the same characteristics as a conventional 3-phase induction motor. When the switch 11 is closed, however, the lamp-current induced in the coils of the lamp-circuit by transformer action will divide itself equally between the two tapped portions of the diametrically opposed coils $c^2$ and $c^4$, so that whatever radial magnetic effect the induced lamp-current may have on the rotor will be applied to the rotor in opposite directions at diametrically opposed points and will thus balance out with a zero resultant effect on the rotor. Thus the rotor of the motor will not tend to vibrate in its bearings from any unbalancing effect of the lamp-current.

Referring now to Figs. 3 and 4, the motor illustrated thereby is the same in construction as the motor of Figs. 1 and 2 in all respects with the exception of the coil groups $g^5$ and $g^6$ of phase 1. The coils of these groups have the same number of turns of the same size wire as the remainder of the coils of the winding. Each of coils $c^5$ and $c^6$ has the same total number of turns as each of the other coils of the winding. Coil $c^5$ is tapped at $t^5$ and coil $c^6$ is tapped at $t^6$. These taps lead to lamp 12' through the switch 11'. Coils $c^5$ and $c^6$ are directly connected together by the conductor 14. The taps $t^5$ and $t^6$ are so connected to the coils $c^5$ and $c^6$ that the lamp 12' spans the same number of turns of each coil. In other words the number of turns in coil $c^5$ between tap $t^5$ and the conductor 14 is equal or substantially equal to the number of turns in coil $c^6$ between conductor 14 and tap $t^6$.

Thus, when the switch 11' is closed, the induced lamp current will traverse only an equal number of turns of each of the diametrically opposed coils $c^5$, and $c^6$ and hence the radial magnetic effect of such lamp current on the rotor R will be applied to the rotor in opposite directions at diametrically opposed points and will thus balance out.

The invention is not to be understood as limited to the specific motors shown and described by way of illustration.

Having thus set forth the nature of the invention what I claim herein is:

An alternating current motor comprising a slotted stator-core and a conventional rotor, said stator having a stator-magnetizing winding comprising a plurality of conventional pre-formed coils and a single pair of specially tapped pre-formed coils, said specially tapped pre-formed coils being each completely disposed in a respective pair of stator-slots and diametrically opposed in said stator-core, the taps of said pre-formed coils being directly connected together, and said special coils being connected in a balanced stator-core-magnetization circuit with said conventional coils in which magnetization circuit the coils are evenly and uniformly distributed circumferentially of the stator-core to produce a uniform rotating magnetic field.

PHILIP H. TRICKEY.

CERTIFICATE OF CORRECTION.

Patent No. 2,173,458.                                                September 19, 1939.

PHILIP H. TRICKEY.

It is hereby certified that error appears in the printed specification of the above numbered patent requiring correction as follows: Page 1, second column, line 55, after the word "which" insert are connected to line terminal $T_1$, are divided into; and that the said Letters Patent should be read with this correction therein that the same may conform to the record of the case in the Patent Office.

Signed and sealed this 10th day of October, A. D. 1939.

(Seal)
                                                                Henry Van Arsdale,
                                                        Acting Commissioner of Patents.